(No Model.)
2 Sheets—Sheet 1.
E. M. BENTLEY.
METHOD OF DETECTING GROUNDS IN AN ELECTRIC DISTRIBUTING SYSTEM.
No. 400,181. Patented Mar. 26, 1889.
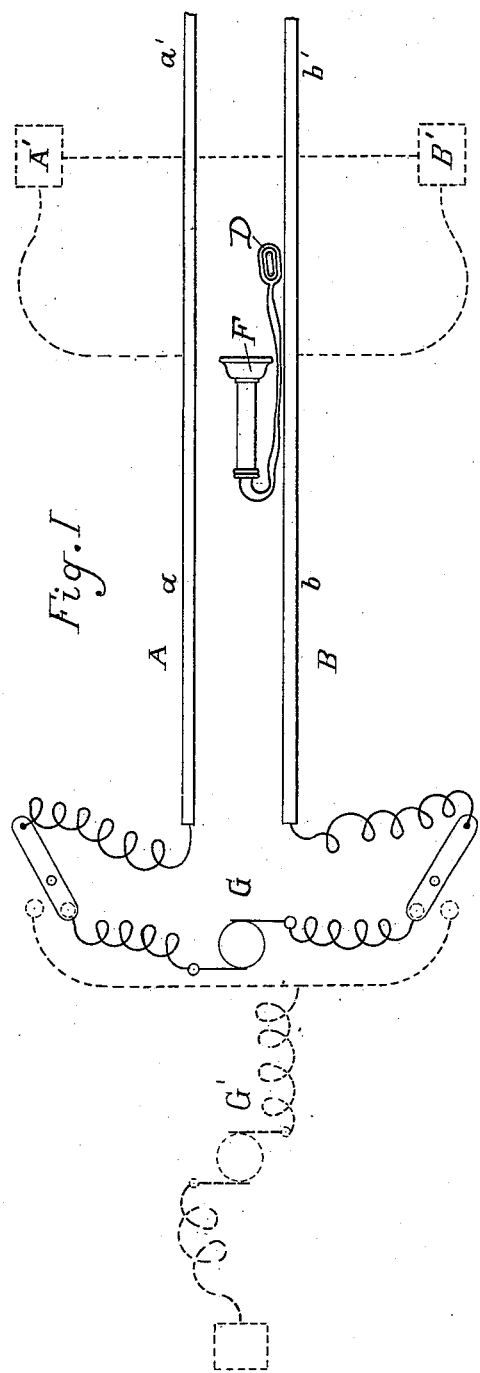
Fig. I
WITNESSES.
Julius M. Eliot
Joseph E. Que
INVENTOR.
Edward M. Bentley
by Bentley & Knight
Atty's (No Model.) 2 Sheets—Sheet 2.
E. M. BENTLEY.
METHOD OF DETECTING GROUNDS IN AN ELECTRIC DISTRIBUTING SYSTEM.
No. 400,181. Patented Mar. 26, 1889.
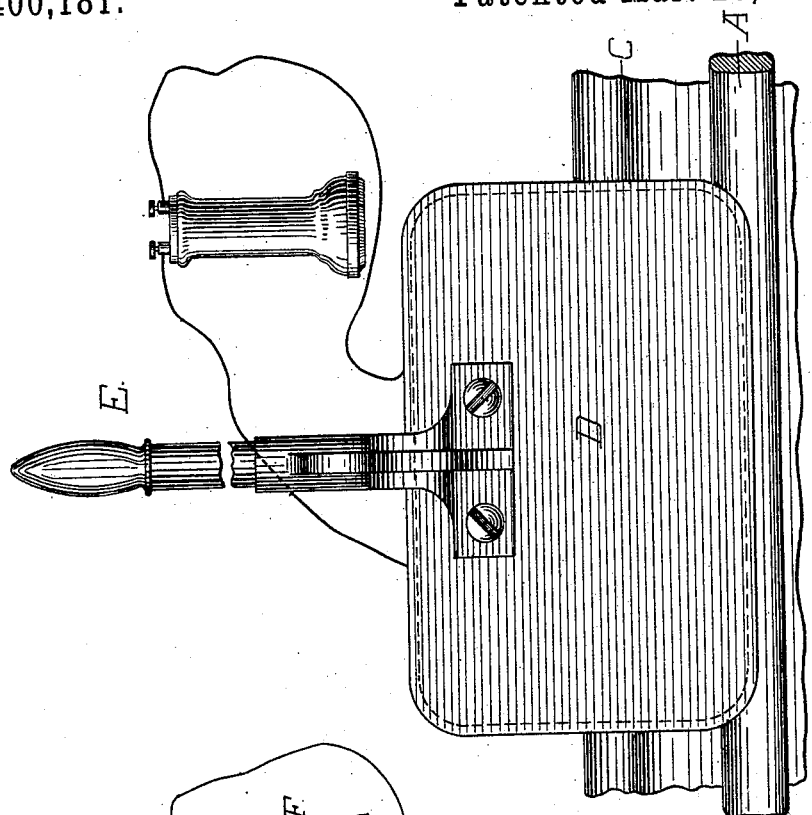
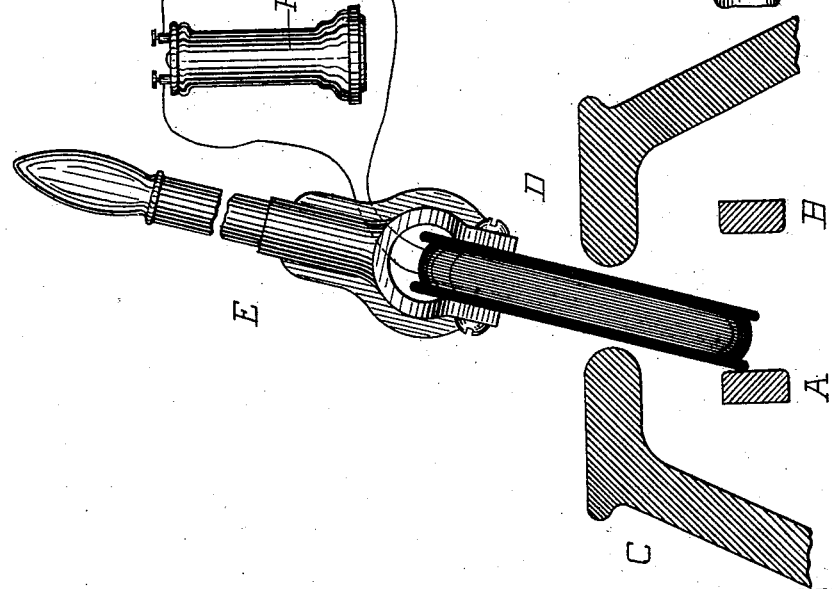
WITNESSES
E. S. McKinney.
Joseph E. Que
INVENTOR
Edward M. Bentley
by Binkley & Knight
Attys.

UNITED STATES PATENT OFFICE.

EDWARD M. BENTLEY, OF NEW YORK, N. Y.

METHOD OF DETECTING GROUNDS IN AN ELECTRIC DISTRIBUTING SYSTEM.

SPECIFICATION forming part of Letters Patent No. 400,181, dated March 26, 1889.

Application filed December 5, 1888. Serial No. 292,693. (No model.)

*To all whom it may concern:*

Be it known that I, EDWARD M. BENTLEY, a citizen of the United States, residing at New York, in the county of New York, State of New York, have invented certain new and useful Improvements in the Method of Detecting Grounds in an Electric Distributing System, of which the following is a specification.

My invention relates to electric-distribution systems, especially those in which the line-conductor is contained in an underground conduit, as in electric railways; and it consists in certain methods of locating grounds upon the line, which are hereinafter described and claimed.

In a single-wire system, when the line-conductor becomes grounded at any point, a complete circuit is formed, having the ground as a return, and likewise in a two-wire system, when either conductor becomes grounded, or when both conductors become grounded or otherwise short-circuited, complete artificial circuits may be readily formed. These circuits will include only such portions of the line conductor or conductors as are between the generator and the grounded point, so that it is apparent that when a fault occurs in either system there will be a variation in the current upon the conductor-sections immediately preceding and succeeding the ground. My invention is based upon this fact, for by testing the line at various points with an indicator which responds to the changes in the line-current the ground can be readily located.

My invention is illustrated in the accompanying drawings, wherein—

Figure I is a diagrammatic view of a distribution system in which both wires are grounded, and Figs. II and III are respectively a side and end view of the induction-coil as employed in my invention.

A and B represent, respectively, the main conductors of a two-wire distribution system—for example, an electric railway—and C is an inclosing-conduit of any desired construction.

D is an induction-coil, made of such shape as to be readily inserted and withdrawn through the slot in the conduit. This induction-coil consists of a single coil, which acts as the secondary, the line-conductor serving as the primary. It has a handle, E, and a telephone or other suitable indicating device in circuit with the induction-coil and accessible from without the conduit.

G is a generator supplying an irregular circuit to the line. It may be connected directly to the conductors A B, as shown in full lines, Fig. I, or it may have one pole permanently grounded and connected at will through its other pole to either line-conductor by any suitable switches and connections, as indicated in dotted lines at G', Fig. I.

I will now describe my method of locating grounds with the apparatus already referred to, and attention is called to Fig. I of the drawings.

Suppose that conductor A has become grounded at A'. I complete the circuit to generator G—as, for instance, by grounding conductor B at B'. The generator G will then throw an irregular current upon the circuit comprising the two grounds A' B' and the portions $a\ b$ of the line-conductors between the generator and the grounds, while no current will pass upon the succeeding portions $a'\ b'$. I then induce successive secondary currents by passing the induction-coil D along the conductor A, and as these currents will be proportional to that in the primary the variation in the induced current, as shown by the indicator when passing the grounded point, will determine its location. If there were more than one fault upon the line, this fact also could be ascertained, for the current in the indicator-circuit would vary when passing each fault, and the amount of variation would be proportional to the resistance of the leak. Should both conductors become grounded or otherwise short-circuited, it would of course be unnecessary to provide an artificial ground, but the generator would be coupled to the conductors and the desired indications obtained.

I claim as my invention—

1. The method of detecting grounds on an electric railway having a normally-insulated line-conductor, which consists in first sending an irregular current through the grounded conductor, then moving along in proximity thereto an induction-coil connected to an accessible indicator, and noting on the indicator the variation in the induced current caused by the coil passing the grounded point.

2. The method of detecting grounds on an electric railway having an inclosed conductor, which consists in first sending an irregular current through the conductor, then moving along in the inclosure in proximity to the conductor an induction-coil connected to an accessible indicator, and noting on the indicator the variation in the induced current caused by the coil passing the grounded point.

3. The method of detecting faults upon an electric railway or other circuit having a normally-insulated line-conductor, which consists in first sending an irregular current over the conductor, inducing therefrom a secondary current, and applying an indicator to the secondary current, substantially as described.

4. The method of detecting grounds or short circuits on an electric railway having a normally-insulated line-conductor, which consists in first sending an irregular current through the faulty conductor, then inducing therefrom a series of secondary currents at various points along the line, and, lastly, noting the variation in these induced currents, and thereby locating the fault.

EDWARD M. BENTLEY.

Witnesses:
 ROBT. W. BLACKWELL,
 JULIEN M. ELLIOT.